Jan. 31, 1961        D. M. OLSON        2,969,712

HIGH TEMPERATURE MICROSCOPE AND FURNACE

Filed Dec. 21, 1959        7 Sheets-Sheet 4

Fig. 4

WITNESSES:
Roy H. Smith, Jr.
Victor G. Laslo.

INVENTOR.
Donald M. Olson
BY

Jan. 31, 1961 D. M. OLSON 2,969,712
HIGH TEMPERATURE MICROSCOPE AND FURNACE
Filed Dec. 21, 1959 7 Sheets-Sheet 7

WITNESSES:
Roy H. Smith, Jr.
Victor G. Laslo.

INVENTOR.
Donald M. Olson
BY

United States Patent Office 2,969,712
Patented Jan. 31, 1961

2,969,712

HIGH TEMPERATURE MICROSCOPE AND FURNACE

Donald M. Olson, Los Alamos, N. Mex., assignor to the United States of America as represented by the United States Atomic Energy Commission Filed Dec. 21, 1959, Ser. No. 861,164

8 Claims. (Cl. 88—39)

The present invention relates to microscopes and furnaces for use in high temperature metallography, and in particular to furnaces and microscopes for observing the behavior of materials heated to temperatures approaching the melting points of the structural materials in the vicinity of the specimen, e.g., 2900° C. for tantalum and 3370° C. for tungsten. It also deals with optional means for observing the behavior of materials heated to temperatures at which they are not incandescent.

Although the field of high temperature microscopy is comparatively new, it is known that other workers in the field have developed some devices which may be useful for such purposes. However, such devices suffer limitations of one sort or another, particularly in the maximum temperature achievable and in the complete separation of furnace and microscope. Prior workers have for the most part overlooked the principle of operation embodied in the present invention, and have relied on conventional optical objectives for producing an image of the specimen held at a high temperature. Prior workers have concentrated their efforts on refracting systems which are incapable of operation within a high temperature furnace, and as a result have been severely limited by the necessity for disposing their refracting lens systems outside of the furnace.

The present invention has as its major component a furnace in which a specimen is heated to incandescence on the optical axis of a reflecting optic which is also situated within the furnace. This optic consists of a concave first surface mirror which reflects the light emitted by the specimen, back past and around the specimen and through an inert optic which closes the bottom of the furnace. Thereafter the reflected light follows a long optical path, broken up for convenience into a number of short lengths by a series of first surface reflecting plane mirrors until it forms an image on a final plane mirror which may conveniently be viewed through standard microscope objectives and eye pieces to produce high magnifications, or may be viewed directly at the minimum magnification of 30.

It is, therefore, the principal object of the present invention to provide a high temperature microscope and furnace for observing the behavior of specimens heated to their incandescent temperatures.

A further object is to provide a high temperature microscope and furnace in which the principal optical element is disposed within a vessel which also contains the furnace elements.

An additional object is to provide a high temperature furnace and microscope capable of producing an image of large magnification solely with reflecting optics.

Another object is to provide such a high temperature microscope and furnace which does not use refracting lenses except for standard eye pieces.

A subsidiary object is to provide such a high temperature microscope and furnace which includes auxiliary means for illuminating the specimen under observation.

The present invention can be more clearly understood by referring to the drawings attached to the present specification, in which—

Figures 2 and 3 are an elevation of the furnace from the righthand side of Figure 1, Figure 2 depicting the upper portion thereof, in particular the illuminator, and Figure 3 showing the lower portion of the furnace; Figure 2 being drawn to a somewhat larger scale than Figure 3;

Turning now to Figures 1–6 of the drawings, the major subassemblies of the furnace consist of lower housing 1, upper housing 19, base 55, cover 27, hinge 2 and clamping ring 63. Illuminator 73 is mounted above the furnace by inserting it with a sliding fit in illuminator retaining nut 111. Inside or protruding from the housing as defined by the aforementioned elements are compound assembly 33, main radiation shield 44, heater 90, specimen platform assembly 94, specimen platform camming assembly 100 and worm drive assembly 105.

Figure 5:
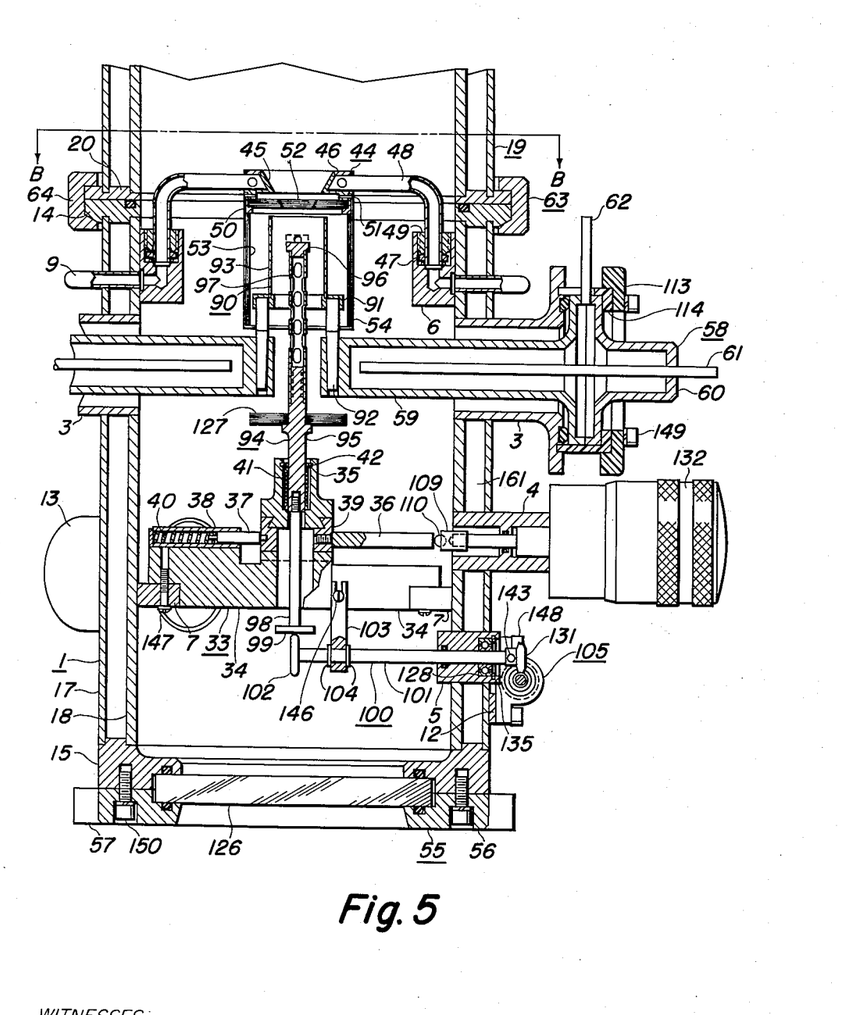
Figure 6:
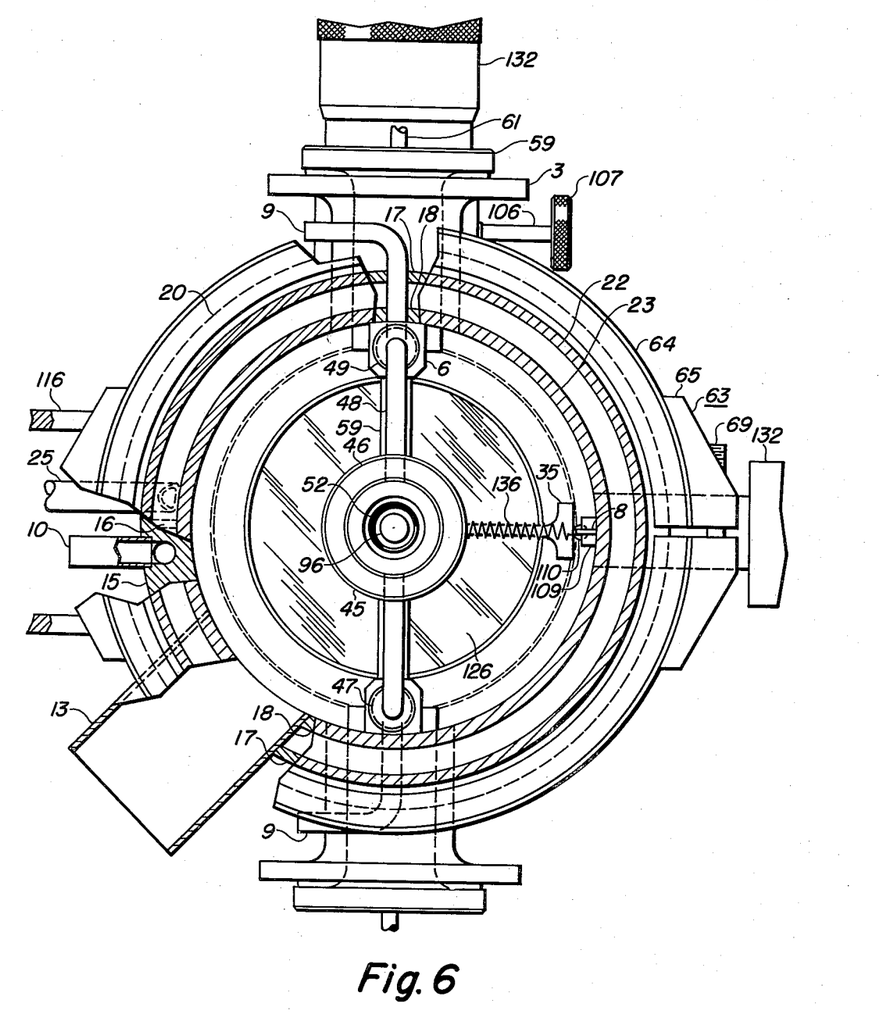
Figure 6 is a horizontal cross section of the furnace on lines BB of Figure 5.

Lower housing 1 is made up of outer wall 17, inner wall 18, bottom flange 15 and top flange 14, such parts all being preferably of stainless steel and welded together to form a vacuum type enclosure. The space between the inner and outer walls defines an annular coolant channel 161, into which, through appropriate openings in outer wall 17, are extended and soldered copper tubes 10 and 11 for connection to a water supply. Proper circulation of the coolant is insured by a vertical baffle 16 in channel 161 extending the full height of the channel between the orifices of tubes 10 and 11 (see Figure 6). Also inserted in appropriate openings and welded to the walls 17 and 18 of the lower housing are a pair of positioning rod bushings 4, a cam shaft bushing 5, and a pair of electrode bushings 3. Gas tube 13, for connection to a vacuum system or a supply of inert gas, likewise extends through and is welded to both walls 17 and 18, terminating flush with the inner surface of wall 18, as indicated in Figure 5. A pair of supporting blocks 7 are welded to the inside surface of wall 17 to support compound slide assembly 33, hereinafter termed simply "compound assembly" and a plate 12 is welded to the outside of outer wall 17 to support the worm drive assembly 105. In the upper part of lower housing 1, a pair of coolant tubes 9 extend through both walls into a pair of coolant tube connecting blocks 6 to supply coolant to the main radiation shield assembly 44. All such parts extending through or mounted on the housing are welded or soldered to maintain a tight vacuum within the housing.

Figure 1:
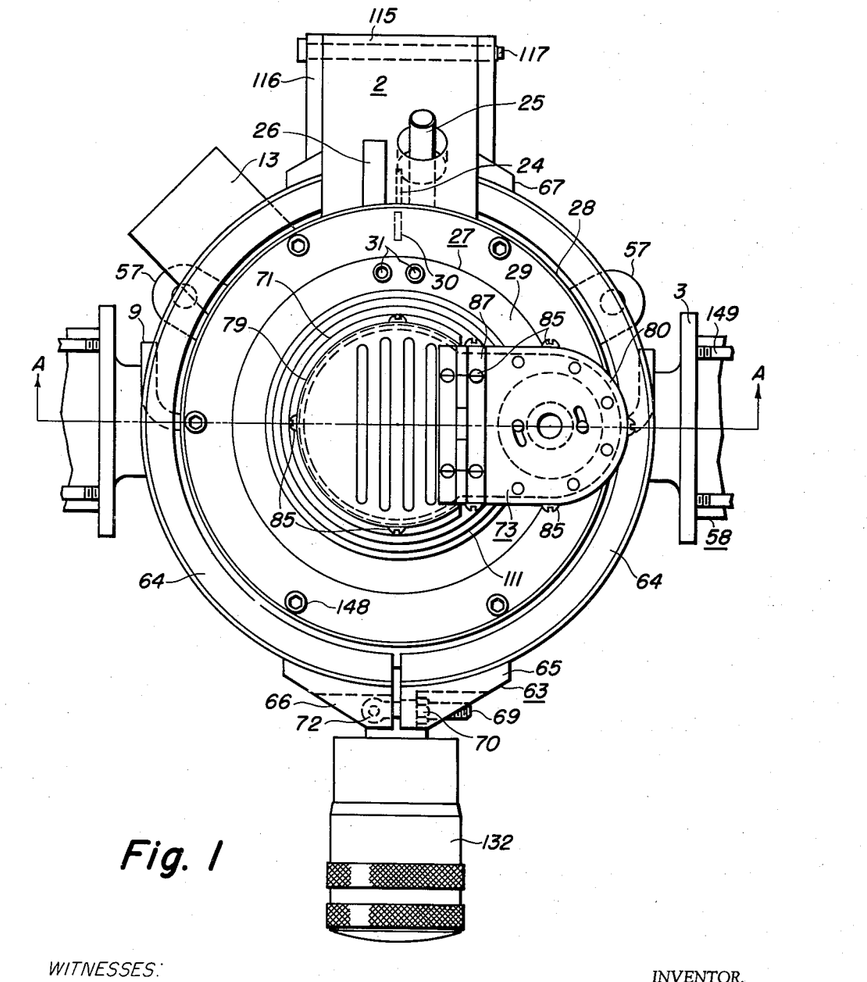
Figure 1 is a plan view of the furnace of the present invention.

Upper housing 19 consists essentially of bottom flange 20, top flange 21, outer wall 22 and inner wall 23, all parts being preferably of stainless steel. The upper housing, of course, is mounted coaxially with lower housing 1 so that the outer edge of bottom flange 20 is flush with the corresponding edge of upper flange 14. Upper housing 19 is also provided with a pair of coolant tubes 25 and 26 extending through outer wall 22 into annular coolant channel 162. In view of the small circumferential gap between these two coolant tubes, as indicated in Figure 1, a vertical baffle 30 is provided between the two tubes and extends the full height of coolant channel 162 to insure circulation of the coolant around the complete annulus thereof Lower housing 1 and upper housing 19 are joined together at their mating flanges by clamping ring 63, consisting of the vertically pivoted hinge 67, ring halves 64, clevis 66 and eye bolt receiver 65. Eye bolt 69, pivoted in clevis 66 by clevis pin 72, swings into an appropriate slot cut in eye bolt receiver 65, and is secured in place to tighten the clamp by nut 70.

Base 55, consisting of ring 56 and three mounting lugs 57 welded thereto, is joined to lower housing 1 with screws 150 to secure therebetween the optically inert quartz window 126, appropriate O-rings being used in the indicated slots to preserve a vacuum tight condition. Mounting lugs 57 are provided with holes for mounting the furnace on table top 202 of Figure 7 so that the furnace is coaxial with circular opening 203 of the table. Note that mounting lugs 57 have been omitted from Figure 6 in the interest of clarity.

Figure 2:
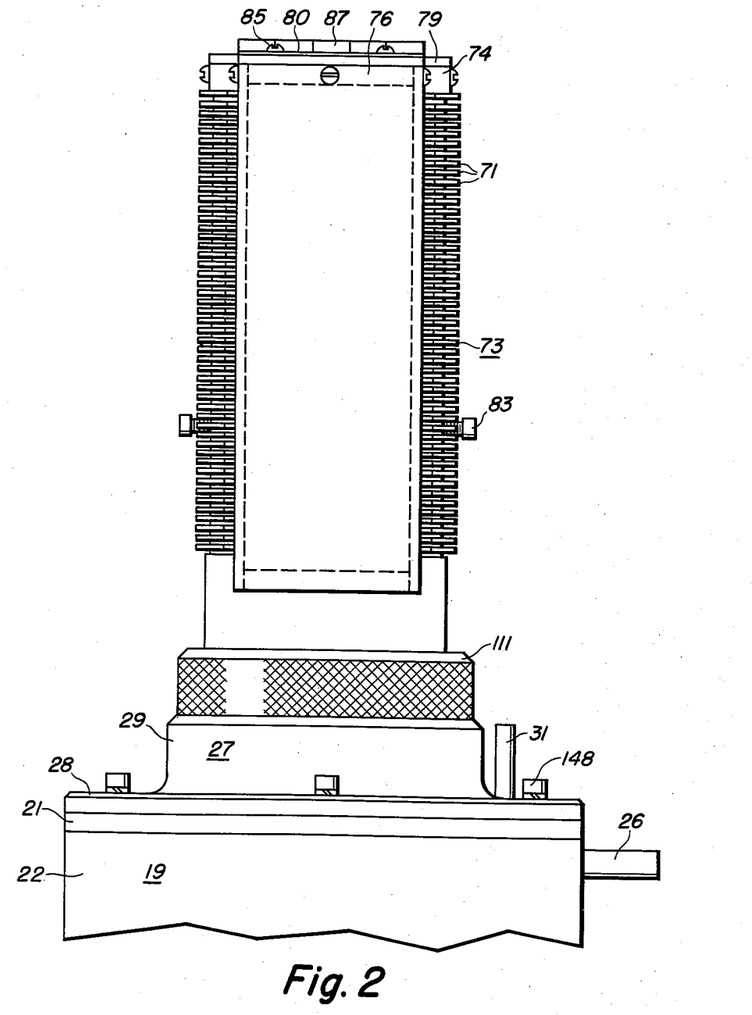

To close the top of the furnace, cover assembly 27 is secured to top flange 21 of upper housing 19 with screws 148, and the illuminator retaining nut 111 is threaded into the window pocket member 29 of the cover. The cover 27 consists of a member 28 which forms a pocket for the concave first surface mirror 121, and the aforementioned window pocket member 29, these parts being welded together prior to assembly. The member 28 also defines an annular coolant channel 163 to prevent glass member 121 from becoming overheated. Coolant is supplied to and withdrawn from channel 163 by a pair of copper tubes 31 extending through member 29, as indicated in Figures 1 and 2. The two coolant tubes are separated by a vertical baffle member (not shown) in channel 163 extending over the full L-shaped cross section thereof. Mirror member 121 is secured in the pocket of copper member 28 by a copper retaining ring 112 and screws 145. The mirror member 121 consists of fused quartz coated on its lower surface with rhodium to form a reflecting surface and an anti-abrasion coating of silicon monoxide. It is 4 inches in diameter and has a 2-inch diameter central aperture. The particular mirror used is elliptical, and is defined by rotating an ellipse having a major semi-axis of 62 inches and a minor semi-axis of 21.9 inches, the optical element being centered at one end of the major axis during the grinding process. The top closure is completed by inserting the optically inert quartz window 125 in the pocket of member 29, with the appropriate O-rings shown, and screwing retaining ring 111 down into member 29.

Hinge 2 furnishes a convenient means of pivotably connecting upper housing 19 to lower housing 1 so that the upper housing may be moved out of the way, after removing clamping ring 63, for assembling components in the lower housing 1, mounting specimens and the like. Hinge 2 consists simply of upper hinge plate 115 and lower hinge plate 116, the two being joined by hinge pin 117, all preferably of steel. The unpinned ends of these hinge plates are welded to the outer walls of the housings, plate 115 to wall 22 and plate 116 to wall 17. Holes are provided in 115 and 116 as shown for the passage of coolant tubes 11 and 25. In operation, the ends of coolant tubes 11 and 25 are joined by a length of flexible tubing to permit ready operation of hinge 2. The same coolant thus passes successively through annular coolant channel 161 of the lower housing and annular coolant channel 162 of the upper housing, although separate coolant circuits may be supplied if desired.

Figure 3:
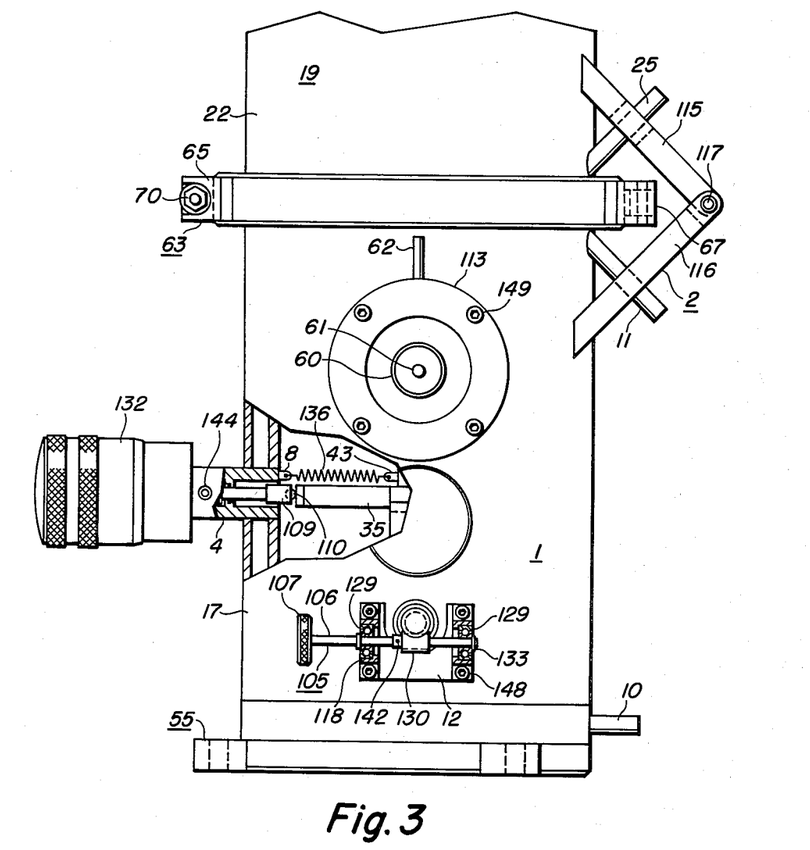
Figure 4:
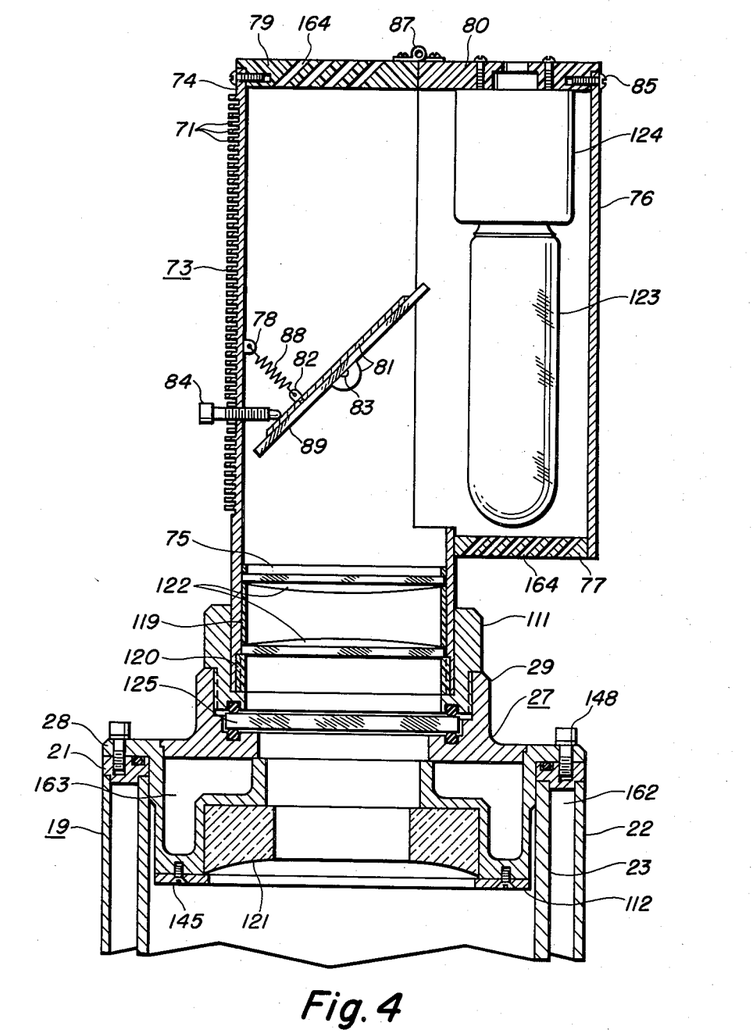
Figures 4 and 5 portray a longitudinal section in lines AA of Figure 1, Figure 4 showing the upper part of the furnace and Figure 5 the lower, Figure 4 being drawn to a somewhat larger scale than Figure 5.

Compound assembly 33 provides the means for moving the specimen platform assembly 94 in both the "X" direction, from left to right and vice versa in Figure 5, and the "Y" direction, perpendicular to the view of Figure 5, and left to right in Figure 3. It consists of a fixed block 34 mounted on supporting blocks 7 by screws 147, moveable "X" block 39 mounted on the dovetailed ways on the upper surface of block 34 and a moveable "Y" block 35 mounted on dovetailed ways on the upper surface of "X" block 39. These components are designed for a movement of ¼-inch in each direction from center, or a total travel of ½-inch. The cylindrical opening in lock 35 accommodates linear ball bearing assembly 41, held in place by retaining ring 42. Movement in the "X" direction is provided by positioning rod 36 threadedly engaging the block 39 on the righthand side, and spring plunger 37 together with compression spring 40 on the left-hand side. The spring and plunger operate within spring housing 38, the latter being welded to the upper surface of fixed block 34. The "X" position is determined through the operators' manipulation of micrometer assembly 132 mounted on bushing 4 and terminating in cup 109 having a steel ball 110 embedded in its tip. An O-ring is provided around the shaft of the micrometer head to insure maintenance of a vacuum within the furnace. Note that micrometer assembly for "X" motion has been omitted from Figure 1 for clarity, as it lies below the righthand electrode assembly 58 of that figure.

Movement in the "Y" direction (see Figures 3 and 6) is provided by an arm of "Y" block 35 which extends to the left in Figure 3. As indicated in such figure, the operator controls the "Y" position by manipulation of a second micrometer assembly 132, similarly mounted on a bushing 4 by a set of screws 144, this assembly also terminating in a cup 109 having a ball 110 embedded in its tip. Reverse movement, i.e., to the left in Figure 3, is provided by tension spring 136 fastened at one end to spring hook ear 8 secured to bushing 4 and at the other end to spring hook ear 43 secured to "Y" block 35.

Extending through the indicated openings in the compound assembly is the specimen platform assembly 94. Proceeding from bottom to top in Figure 5, this consists of bearing plate 99, tie rod 98, shaft 95, stage support tube 97 and stage 96. Bearing plate 99 is welded to tie rod 98, the latter being threadably secured to the non-rotating shaft 95. Stage support tube 97 is slideably fitted over the upper end of shaft 95, and stage 96 is slideably fitted into the top of support tube 97. Members 95, 96 and 97 are made of a highly refractory material such a molybdenum, tantalum or tungsten, the last being used in the preferred embodiment of the present invention. Although shown with a plane upper surface, stage 96 may be drilled and threaded to engage a specimen, may be dished out to hold a specimen at its center, etc. Stage support tube 97 is provided with a number of openings in its wall, as indicated, to increase its heat dissipation. Shaft 95, which is not rotated but is only moved linearly in the "Z" direction, i.e., along or parallel to the longitudinal axis of the furnace, rides in linear bearing 41 and has a shoulder as indicated to support the lower radiation shield 127. This shield 127 consists of ten tantalum disks having the dimensions of 1¾-inches O.D., ⁹⁄₃₂-inch I.D. and each of 10 mils thickness in the particular embodiment shown. When used with the particular mirror previously described, the specimen platform assembly has a "neutral" position along the "Z" axis such that the top surface of stage 96 is 4 inches from the optical center of mirror 121. The camming mechanism to be described provides for movement of the entire specimen platform assembly ¼-inch up or down from such neutral position for a total travel of ½-inch. The extreme upper position is indicated by the phantom outline of stage 96 in Figure 5.

The specimen platform assembly is partially supported and its "Z" position determined by cam shaft assembly 100. This assembly consists of shaft 101, cam 102 eccentrically secured to its end and hanger 103 secured by screw 146 to the fixed block 34. Hanger 103 is made of beryllium-copper and has an appropriate opening furnishing a bearing surface for shaft 101, the position of the latter with respect to the hanger being secured by retaining rings 104. Shaft 101 is supported in bushing 5 by a bearing 128 and extends to the outside of the furnace, having a worm gear 131 secured on its outer end by set screw 143.

The worm gear 131 engages a mating worm gear 130 of the worm drive assembly 105 (see Figure 3). Gear 130 is supported on and secured to shaft 106 by a pin 142. Shaft 106 is supported in bearings 129 and is prevented from sliding by retaining rings 133. The shaft extends beyond the left bearing of Figure 3 and terminates in a knob 107. The bearing blocks 129 are secured to plate 12 by screws 148. The worm drive assembly has been omitted from Figure 1 in the interest of clarity.

The heater assembly 90 of the furnace consists of a tantalum heater tube 93 open at both top and bottom, a pair of tantalum half rings 91, the latter having an annular slot to accommodate tube 93, and a pair of tantalum pins 92, each of which slideably engages one of the tantalum half rings 91 in an appropriate recess in the latter. The bottom portion of each tantalum pin 92 is tapered to fit into an inner electrode member 59. These heater elements are preferably made of tantalum, as indicated, although molybdenum or tungsten are suitable substitutes. The tantalum half rings 91 do not touch, but are separated at two diametrically opposite points each of which lies midway on its periphery between pins 92. Heater tube 93 is provided with a pair of corresponding notches about $\frac{1}{16}$-inch wide and extending from the bottom to about $\frac{1}{4}$-inch from the top of the tube. The top of one of these notches appears in Figure 5 within the phantom position of stage 96. The tube is disposed so that such notches register with the gaps between rings 91, thereby insuring a current path which encompasses the full volume of the heater tube. In the particular embodiment illustrated, heater tube 93 has an O.D. of 1 inch, a wall thickness of .020 inch and a height of 2 inches. It will absorb almost all of the electrical input to the furnace, e.g., 600 amps. at 11 volts and unity power factor, to produce temperatures limited only by its own melting point.

Electrical energy is supplied to the furnace from the outside through a pair of identical electrode assemblies 58. Each comprises a hollow inner electrode member 59 and a hollow outer electrode member 60, both parts being of hard drawn copper. A coolant inlet tube 61 is soldered to outer member 60 and extends axially almost the full length of the assembly, and a coolant outlet tube 62 is provided at the inner circumferential joint of the two halves. The electrode assembly is secured to bushing 3 with screws 149, the assembly including an insulator spacer 114 and a clamping ring 113, both of which are composed of a cloth base phenolic such as Bakelite or Micarta. The coolant tubes 61 and 62 are preferably soft copper and are soldered to the electrodes to provide a watertight assembly. The assembly to bushing 3 includes, of course, an O-ring to preserve a vacuum type condition.

Disposed coaxially with the heater assembly is the main radiation shield 44. This consists of a coolant ring 45 having an annular coolant passage therein, a ring shaped top shield support 50 secured to ring 45 by a multiplicity of pins 51, top radiation shield 52, circumferential radiation shield 53, circumferential shield cover 54, also secured to shield support 50 by pins 51, and the coolant ring cover 46. A pair of stainless steel coolant pipes 48 extend from diametrically opposite openings in ring 45 to the coolant tube connecting blocks 6 on the inside surface of wall 18. The coolant members are assembled by inserting the beveled ends of tube 48 into the openings in ring 45 and soldering them in place, after which the cover 46 is soldered in position. A pair of holes drilled transversely to the axis of each tube 48 at its end within ring 45 provides flow channels from the tubes to the ring. Members 45 and 46 are preferably made of stainless steel. Ring member 50, which is preferably of tantalum, has a recess to support the top radiation shield 52, consisting of ten tantalum disks of $1^{15}/_{16}$ inches O.D., $2^{1}/_{32}$-inch I.D. and .010-inch thickness. The holes in these disks may be of such uniform diameter or they may be tapered, as indicated in the drawings, the difference being trivial in the total thickness of 0.100 inch. The circumferential radiation shield 53 is also of tantalum and consists of a spiral of sheet material, 2 inches wide by .005 thick, wrapped to form ten to fifteen layers. The cover 54 for this circumferential shield is of .010-inch thick tantalum and is crimped at its bottom end to support shield 53. The ends of coolant tubes 48 terminating in blocks 6 are each fitted with a bushing 47 soldered to the tube and a bushing 49 slideable on tube 48. The bushing 49 is threaded on its outside surface to engage corresponding threads in the recess in block 6 to secure a watertight connection. Bushing 49 is provided with appropriate openings in its upper surface for engagement by a spanner wrench.

Illuminator assembly 73 (see Figures 1, 2 and 4) is furnished to illuminate the specimen supported on stage 96 when such specimen is being examined at a temperature such that it is not luminescent. When the opposite condition prevails, i.e., when such a specimen is luminescent, illuminator assembly 73 may simply be raised out of retaining ring 111 and may be replaced with a pyrometer for determining the specimen temperature. The housing for the illuminator is defined by mirror housing 74, a truncated cylinder in shape, the semi-cylindrical lamp housing 76, lamp housing bottom 77, mirror housing cover 79 and lamp housing cover 80, the latter being attached to cover 79 by hinge 87 and screws 85. All parts are of brass except covers 79 and 80 which are composed of a cloth base phenolic such as Bakelite. Cover 79 and bottom 77 contain a number of diagonal slits 164 to allow the passage of air through the housing to carry away heat. The mirror housing 74 is provided with a multiplicity of fins 71 for the same purpose. Cover 80 is provided with the appropriate openings indicated for mounting lamp socket 124 and for connecting electrical leads thereto.

Disposed within the mirror housing 74 on mirror backing and pivot member 81 is a first surface plane mirror 89, elliptical in plan to fit properly into cylindrical housing 74 at the indicated angle. Member 81 is supported from the housing by a pair of pins 83, the latter being threaded through appropriate openings in housing 74. The mirror is held in the desired position, at an angle of 45 degrees to the optical axis—which is also the longitudinal axis of the furnace and the mirror housing, by tension spring 88 and adjusting screw 84, the latter bearing against the back of member 81 and the former being hooked to spring hook ear 78 on housing 74 and spring hook ear 82 on the back of member 81. (Pins 83 and screw 84 are omitted from Figure 1 for clarity.)

Mounted from lamp cover 80 by the indicated screws is lamp socket 124 and lamp 123. The latter is a bar filament type lamp and is disposed parallel to the optical axis with the bar lying on the optical axis as reflected by the mirror in its 45 degree position. Welded to the lower inside surface of housing 74 is a positioning ring 75. In assembling the condenser indicated, a plano-convex lens 122 is placed in position against positioning ring 75, a cloth base phenolic spacer 119 is inserted in contact with the lens, a second lens 122 is inserted as shown and lens retaining nut 120 is threaded into the bottom opening of the housing, the latter member also being a cloth base phenolic material. It is to be noted that the lamp and its housing may be swung out of position by pivoting same on hinge 87 for direct inspection of the specimen, adjusting the mirror, replacing the lamp, etc.

Figures 7, 8:
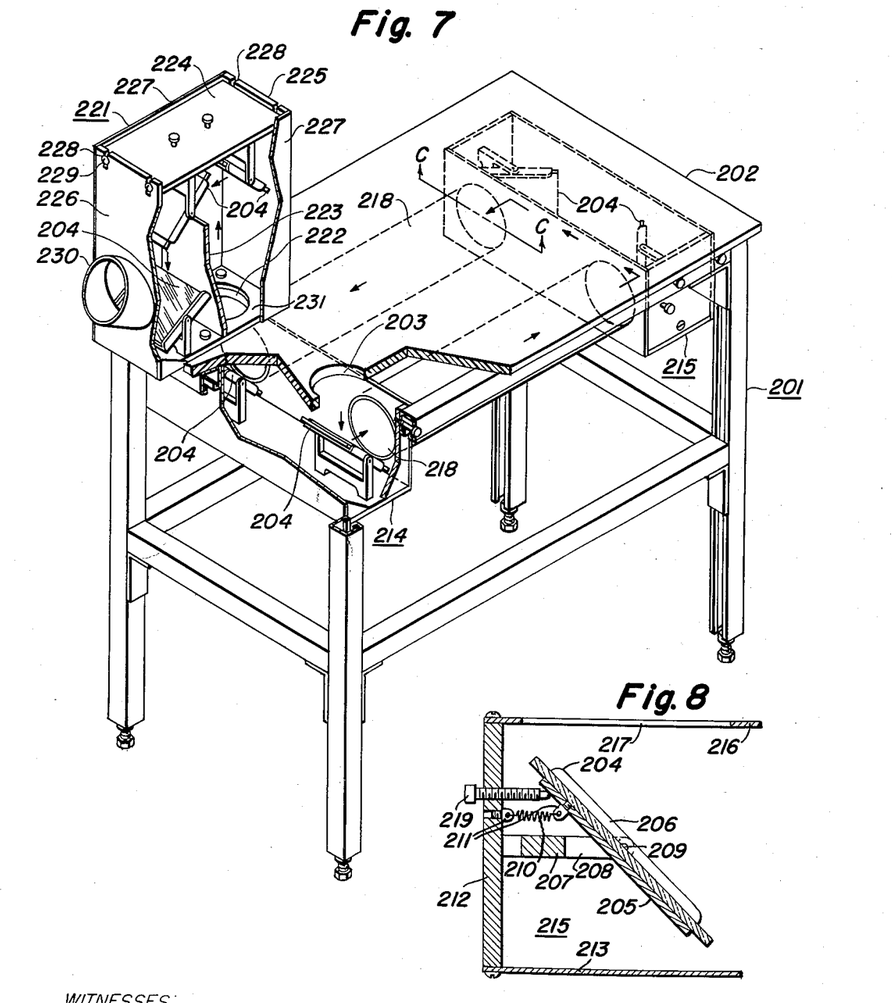
Figure 7 is a prespective view of the present apparatus with the furnace removed, showing the optical system of the present invention external to the furnace.
Figure 8 is a cross section on lines CC of Figure 7, showing the mounting of one of the plane first surface mirror elements.

Figure 7 illustrates the complete assembly of the present invention with the furnace removed for clarity. The furnace when installed is coaxial with opening 203 in table top 202, being secured thereto by appropriate screws through the holes in mounting lugs 57. As indicated in Figure 7, the light rays coming from the bottom of the furnace strike a first mirror 204 and are bent 90 degrees to follow the axis of the 5-inch I.D. aluminum tube 218. The pair of tubes 218 run between front and rear reflector box 214 and 215. In mirror reflector box 215 the light rays undergo two further reflections from a pair of plane mirrors 204 and return to the front reflector box 214 through the tube 218 indicated in the background. Thereafter the light is reflected from a fourth mirror 204 vertically into image erection box 221 through opening 222. Therein there are two further 90 degree reflections from a pair of mirrors 204, the image finally appearing on a seventh mirror 204 for observation through viewing shield 230. The seven mirrors are disposed so that the last mirror is 120 inches from the optical center of the concave reflecting optic 121 in the furnace. The image displayed on the last mirror is thus located at the more distant focus of the elliptical surface defined by mirror 121.

Image erection box 221 consists of back panel 225, front panel 226, a pair of side panels 227, bottom panel 231 and top 224. The latter is secured to back panel 225 and front panel 226 by the four cap screws 229 passing through slots 228 in the front and rear. This arrangement makes it possible to adjust the image distance of the system by lowering or raising top 224 and with it the pair of mirrors suspended therefrom.

Figure 8, a section on lines CC of Figure 7, illustrates the manner of supporting and adjusting the plane mirrors 204, each of which is a first surface mirror approximately 6" x 5" x ¼" thick quartz having a reflective coating of rhodium or the like on the optically active side. In Figure 8, 213 is the rear panel of rear reflector box 215, 212 is an end thereof and 216 is its forward panel. The mirror is supported on mounting bracket 207 which is attached to end panel 212 by screws not shown in the section. Bracket 207 has a pair of mounting arms 208 extending into the box from each end thereof. These arms have appropriate openings for the passage of pins 209 into the mounting ears 206 of mirror backing and pivot plate 205. Mirror 204 is cemented to brass plate 205. The mirror is held in position and adjusted through tension spring 210, hooked to a pair of spring hook ears 211, and adjusting screw 219.

Returning to Figures 4 and 5 for some general remarks, it is first of all to be noted that the illuminator assembly 73 should be withdrawn completely when the furnace is being used to heat a specimen to an incandescent temperature. If this is not done, there is a strong probability that the radiation emitted by the specimen will fracture the refracting lenses 122.

It is also to be noted that the apertures provided in the structural members disposed between the stage and the concave reflecting optic permit essentially all of the radiation visible to the mirror to pass through without obstruction. The large aperture in the mirror does not waste the radiation passing therethrough, as the bulk of such radiation, if reflected from a solid mirror, would simply be reflected to the specimen and the structural members surrounding it to serve no purpose except the conservation of some heat. As may be seen from Figure 6, the structural members surrounding and below the specimen and extending through the sides of the furnace, in particular the radiation shield coolant tubes 48, the electrodes 58, the compound assembly 33 and the platform cam shaft assembly 100 are disposed vertically one beneath the other so as to afford a minimum obstruction of the radiation reflected from mirror 121. Of all such reflected light, 84 percent reaches the bottom of the furnace and passes through quartz window 126. The mirror 121 is preferably an ellipsoid of revolution generated in the manner already described, with the specimen on stage 96 disposed at its near focus, 4 inches from the optical center of the mirror surface along its optical axis and the image plane disposed at the other focus, 120 inches from the same point. While a spherical or other type mirror might have been used, such mirrors produce aberration and result in an image having a much less sharper focus than that obtained with the elliptical mirror of the preferred embodiment, which utilizes the fact that all rays emanating from one focus of an ellipse are reflected by the ellipse to pass through the other focus, all such path lengths between foci being equal.

It is also possible to move the specimen to a variety of distances from the mirror, the image distance then being determined in accordance with the equation $$\frac{1}{u}+\frac{1}{v}=\frac{1}{f}$$

where $u$ is the object distance, $v$ the image distance and $f$ is the focal length of the mirror. This relationship, however, is only completely accurate for a specific object distance for which the mirror is designed, whether spherical or elliptical. It is better to use a fixed object distance and a specific image distance, together with means for moving the object (specimen) to the focus of the mirror, as in the preferred embodiment described.

It should also be noted that another important feature of the present invention is the construction of the radiation shield assembly 44. As already described in detail, each radiation shield of this assembly consists of a multiplicity of thin tantalum sheets. It can be shown that the heat losses through such a stack of lamina is much less than through a solid monolithic wall of the same thickness. As an example, with a specimen heated to 2500° C. in the embodiment described, the temperature changes outside the circumferential radiation shield 53 and cover 54 is less than 850° C. To obtain the same low temperature with a solid wall of tantalum, an impractically large thickness would be required.

In the description above, it has been emphasized that the construction is such that a high vacuum may be maintained in the furnace. It is here pointed out that the construction also permits the use of inert gases at relatively high pressures within the furnace, at least to a minimum of 4000 p.s.i., the design pressure of the welds.

No electrical supply to electrodes 58 has been shown, as the equipment involved is conventional and well known. It might be mentioned that the electrodes projecting from the furnace present no hazard as only a very low voltage, e.g., 11 volts, is applied to such electrodes. The power transformer used to obtain such voltages and the variable autotransformer used to control the current into the furnace are disposed beneath the table shown in Figure 7, together with a vacuum pump for connection to member 13.

As already mentioned, the image produced on the last of the first surface mirrors 204 may be viewed directly through viewing shield 230. This permits a scanning of an area of the specimen of about ⅛-inch diameter with a magnification of 30, and the entire specimen surface may be quickly scanned by manipulation of the micrometers 132. When it is desired to observe particular areas of the specimens in greater detail, conventional microscope objectives and eye pieces may be mounted on the viewing shield to obtain greater magnifications. Camera equipment may also be mounted on the viewing shield, together with the appropriate optical equipment for simultaneously examining the image and photographing the same. Such auxiliary equipment may include filters for examining the infra red and ultra violet regions of the emission from the specimen.

It has been indicated above that the mirrors 121 and 204 are of fused quartz with a metallic reflecting coating. It is possible to substitute solid metal mirrors in place of the quartz, particularly for the plane mirrors. While such a substitution can be made for the main optical element 121, the difficulty of grinding such a mirror from solid metal would probably foreclose such a possibility.

What is claimed is:

1. A high temperature microscope and furnace comprising in combination a pressure vessel having a side wall, a top and a bottom, said bottom being closed with an optically inert window element, said vessel having fittings adapted for connection to means for withdrawing gases therefrom and means for introducing inert gases therein, a concave first surface mirror disposed within said pressure vessel near the top thereof with its reflecting surface facing said bottom and its principal axis extending through said window element, said mirror surface having a curvature such that light emanating from an object disposed within said furnace will be reflected from said mirror to form an image outside of said furnace at a distance therefrom such that essentially no sensible heat will be transferred through said distance, means for supporting a specimen on said principal axis of said mirror at a distance therefrom such that said mirror will project a clear, magnified image of said specimen and to expose the upper surface of said specimen to said mirror, centrally disposed electrical resistance heating means surrounding and spaced from the portion of said supporting means near said specimen and extending toward said mirror to heat said specimen, a radiation shield spaced from and surrounding said heater on all sides to intercept direct radiation from said heating means, said specimen and said supporting means, said radiation shield being spaced from the side wall of said vessel to define a large annular gap for the transmission of radiations reflected from said mirror, said heating means and said radiation shield having top openings sufficient to allow essentially all of the radiations emanating from the upper surface of said specimen in directions lying within the angle subtended by said mirror surface to reach said surface without obstruction, means including electrodes extending through the wall of said pressure vessel and connected to said heating means for supplying sufficient electrical power thereto to heat said specimen to incandescent temperatures, and means for cooling said side wall of said pressure vessel, said mirror and said radiation shield.

2. The microscope and furnace of claim 1 in which said mirror surface is elliptical and said supporting means is disposed to support said specimen so that its upper surface lies approximately at the focus of said elliptical surface nearer to said mirror.

3. The furnace and microscope of claim 2 which includes a multiplicity of optical containers external thereto, one said container being attached to said furnace and the balance to each other in such fashion as to form a continuous, light-tight optical channel, a multiplicity of first surface plane mirrors disposed in said channel to reflect the beam of radiations emerging from said furnace along said optical channel and break up the total optical path length into a number of segments of convenient length, the last of said mirrors being disposed at the other focus of said elliptical surface to capture the image of said specimen in a position for convenient viewing through an orifice in the last of said optical containers in said optical chain.

4. The microscope and furnace of claim 2 in which said mirror has a central aperture therein and said top of said pressure vessel is closed by an optically inert window element.

5. The microscope and furnace of claim 4 which includes means removably attached to the top of said pressure vessel for illuminating said specimen.

6. The furnace and microscope of claim 1 in which said radiation shield is composed of a stack of laminations of a highly refractory material.

7. The furnace and microscope of claim 1 which includes means for moving said specimen support and said specimen along lines parallel to said principal axis and along two sets of lines normal to said principal axis, said two sets of lines being normal to each other.

8. A high temperature microscope and furnace comprising in combination an elongated cylindrical pressure vessel having a double side wall defining therebetween an annular coolant channel, a top and a bottom each closed by an optically inert quartz window, said top having an inner wall defining a cylindrical recess coaxial with the longitudinal axis of said pressure vessel and an outer wall spaced from said inner wall to define an annular coolant channel, a concave first surface mirror disposed in said cylindrical recess, said mirror surface being eliptical and facing the bottom of said pressure vessel with its principal axis parallel to and essentially coincident with the longitudinal axis of said pressure vessel, said mirror surface being defined by the rotation of an ellipse with said mirror at one vertex of the major axis of said ellipse, said major axis being considerably greater in length than the height of said pressure vessel, said mirror having a central concentric aperture therethrough, means for supporting a specimen on said principal axis at the focus of said elliptical surface nearer thereto, said support means being cylindrical, coaxial with said pressure vessel and extending into the lower part of said pressure vessel and terminating there in a bearing plate.

centrally disposed electrical resistance heating means surrounding and spaced from the portion of said supporting means near said specimen and extending toward said mirror to heat said specimen, a radiation shield spaced from and surrounding said heater on all sides to intercept direct radiation from said heating means, said specimen and said supporting means, said radiation shield being spaced from the side wall of said vessel to define a large annular gap for the transmission of radiations reflected from said mirror, said heating means and said radiation shield having top openings sufficient to allow essentially all of the radiations emanating from the upper surface of said specimen in directions lying within the angle subtended by said mirror surface to reach said surface without obstruction, said radiation shield being composed of a multiplicity of thin, contacting laminations of a highly refractory material and including a hollow annular member defining an annular coolant channel at its top.

means including electrodes extending through the wall of said pressure vessel and connected to said heating means for supplying sufficient electrical power thereto to heat said specimen to incandescent temperatures, camming means cooperating with said bearing plate to raise and lower said supporting means, said camming means extending outside said pressure vessel and terminating in means adjustable by an operator to determine the axial position of said supporting means, means cooperating with said supporting means to move said supporting means along two lines of action normal to each other and to said longitudinal axis, and coolant means including tubes extending in pairs into said annular coolant passages in said pressure vessel wall, said pressure vessel cover and said radiation shield.

No references cited.